United States Patent [19]

Sheridan

[11] 4,203,349
[45] May 20, 1980

[54] BRAKE BOOSTER

[75] Inventor: Earl A. Sheridan, South Bend, Ind.

[73] Assignee: The Bendix Corporation, Southfield, Mich.

[21] Appl. No.: 892,574

[22] Filed: Apr. 3, 1978

[51] Int. Cl.$^2$ ............................ F15B 13/02; B60J 13/12
[52] U.S. Cl. ........................................... 91/47; 60/548; 60/583; 91/391 R; 251/DIG. 3
[58] Field of Search ................. 60/548, 550, 551, 583, 60/593, 555, 547 R; 251/DIG. 3; 91/391 R, 47

[56] References Cited

U.S. PATENT DOCUMENTS

| | | | |
|---|---|---|---|
| 3,717,178 | 2/1973 | Allen | 251/DIG. 3 |
| 3,884,447 | 5/1975 | Alexander | 251/DIG. 3 |
| 3,896,834 | 7/1975 | Paul, Jr. | 251/DIG. 3 |
| 4,087,972 | 5/1978 | Scheffel | 60/548 |

Primary Examiner—Abraham Hershkovitz
Attorney, Agent, or Firm—Paul David Schoenle; Ken C. Decker

[57] ABSTRACT

A brake booster includes a housing with an inner wall defining a pair of pressure chambers. A passage in the inner wall communicates the pressure chambers with each other and an input member is slidably disposed in one of the pressure chambers and an output member is slidably disposed in the other pressure chamber. A resilient member extends between the inner wall and the input member and substantially defines a variable orifice to control fluid communication between an inlet and a return. The return is disposed within the inner wall and the resilient member comprises a coil spring which permits fluid communication between the coils. When the input member is moved the coil spring is contracted to decrease the spacing between the coils, thereby restricting fluid communication between the inlet and the return. Consequently, increased fluid pressure within the other chamber urges the output member to move thereby actuating braking. In addition, a push member carried by the inner wall provides for transmission of movement from the input member to the output member directly.

2 Claims, 1 Drawing Figure

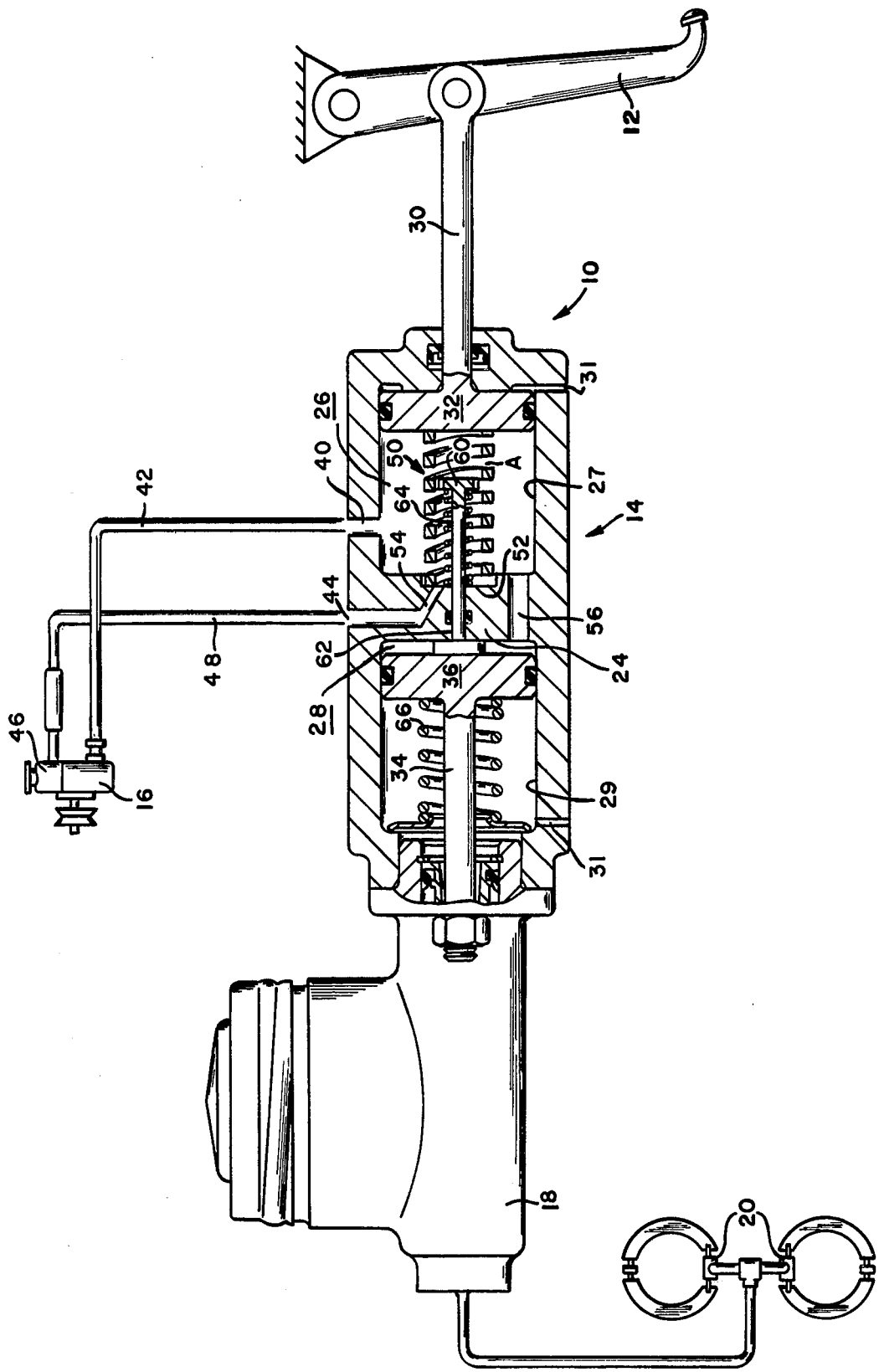

BRAKE BOOSTER

BACKGROUND OF THE INVENTION

In brake boosters of the prior art the valving required to control fluid communication through the booster is generally precision machined with close tolerances so that contamination of the booster fluid severly hinders the operation of the booster. For example, spool valves which are slidably mounted within stepped bores are easily wedged therein if foreign matter or particles are carried in the booster fluid. Consequently, it is believed to be an advance in the state of the art to provide a booster which is economical to manufacture and substantially independent of fluid contamination.

SUMMARY OF THE INVENTION

A brake booster includes a housing which slidably supports an imput member and an output member. An inlet and a return on the housing provide for communication of pressurized fluid through the housing and an inner wall in the housing defines a pair of pressure chambers. A resilient member in one of the pressure chambers forms a variable orifice and biases the input member to a non-braking position. During a braking application, the resilient member is contracted upon movement of the input member to restrict fluid communication from the inlet to the return thereby increasing pressure in the pair of pressure chambers which communicate with each other via a passage in the inner wall. The inner wall also forms the return and the resilient member comprises a coil spring which surrounds an inner wall opening which communicates with the return.

In addition, the inner wall supports a push member which is engageable with the input member upon movement of the latter to transmit movement to the output member.

BRIEF DESCRIPTION OF THE DRAWING

The sole FIGURE is a partial schematic of a brake system with the brake booster of the present invention being illustrated in cross section.

DETAILED DESCRIPTION

In the brake system 10 of the sole FIGURE a brake lever 12 cooperates with a brake booster 14 which communicates with a pressure source 16 and is engageable with a pressure generator 18 such as a master cylinder for the purpose of braking a wheel assembly 20.

The brake booster 14 includes a housing 22 with an inner wall 24 separating pressure chambers 26 and 28. An input member 30 connects with the brake lever 12 and terminates in a piston 32 which is slidably mounted in the housing bore 27 to substantially form the pressure chamber 26. An output member 34 is engageable with the master cylinder 18 and terminates in a piston 36 which is slidably mounted in the pressure chamber 28. In order to communicate pressurized fluid to the pressure chambers 26 and 28, an inlet 40 on the housing 22 communicates with the pressure source 16 via conduit 42 and a return 44 communicates with a reservoir 46 on the pressure source 16 via conduit 48. The bores 27 and 29 are vented via ports 31 which are disposed remote from the pressure chambers 26 and 28.

In accordance with the invention a resilient member 50 extends between the inner wall 24 and the input member 30 to bias the latter to a non-braking position. The resilient member 50 preferably comprises a coil spring and the inner wall 24 includes an abutment surface 52 which is recessed to receive the resilient member 50. An opening 54 on the abutment surface 52 communicates with the return 44 and a passage 56 extends through the inner wall 24 to connect the chamber 26 with the chamber 28.

A further feature of the present invention relates to a push member 60 which is slidably carried in a bore 62 on the inner wall 24. The bore 62 is substantially disposed at the center of the abutment surface 52 so that the push member 60 extends into the central space defined by the coil spring 50. A spring 64 biases the push member 60 toward the input member 30.

MODE OF OPERATION

When the pressure source 16 is operating, pressurized fluid enters the housing 22 via inlet 40 to pressurize chambers 26 and 28 and returns to the reservoir 46 via the return 44. Consequently, pressurized fluid passes between the spacing A of the coil spring 50 to communicate with the opening 54. If the brake lever 12 is pivoted to move the input 30 to the left, the coil spring 50 is contracted to reduce the size of the spacing A so that the coil spring reduces the fluid communication between the inlet 40 and the return 44, thereby increasing the pressure of the pressurized fluid within the chambers 26 and 28. Consequently, the coil spring acts as a variable orifice to control fluid communication between the inlet and the return. With the increase of fluid pressure in chamber 28 the output member 34 is moved to the left as the fluid pressure overcomes the resistance force of return spring 66. The movement of the output member 34 causes the master cylinder 18 to communicate pressurized brake fluid to the wheel assembly 20 to effectuate braking of the latter.

If the pressure source 16 is rendered inoperable, the leftward movement of the input member 30 engages the piston 32 with the push member so that continued movement of the input member 30 moves the push member into engagement with the output member 34. Additional movement of the input member 30 at this time is transmitted directly to the output member 34 via the push member 60. It is important to provide a length for the push member 60 which enables the direct movement of the output member 34 by the input member 30 via the push member before the input member 30 fully contracts the coil spring 50. Because, if the coil spring is fully contracted by movement of the input member, the spacing A is eliminated to transform the coil spring into a rigid member acting as a stop to prevent further leftward movement of the input member.

Although a square cross section for the coil spring 50 is illustrated in the sole FIGURE, it is possible to use a round or oval cross section so long as the coil spring remains in a cylindrical shape during contraction to uniformly meter the fluid communication through the spacing as a function of the contraction of the coil spring.

In addition, if the pressure feedback imparted to the input member by the pressurization of chamber 26 is excessive, it is possible to eliminate the piston 32, provided the input member terminates in a surface which is engageable with the coil spring and the push member.

Many modifications and/or variations of the present invention are possible by those skilled in the art and it is intended that these modifications and/or variations are included within the scope of the appended claims.

I claim:

1. In a brake booster, the combination of a housing having an inlet and a return, said housing having a pair of bores leading to an inner wall, an input member movably disposed within one of said bores, an output member movably disposed within said other bore and cooperating with said inner wall to define a pressure chamber, said inlet and said return opening into said one bore to provide fluid pressure within said one bore, said inner wall including a passage communicating said one bore with said pressure chamber to communicate fluid pressure from said one bore to said pressure chamber, a resilient member extending between said inner wall and said input member and defining a central space, said return being substantially disposed within said inner wall and opening into said central space, said input member being movable toward said inner wall to contract said resilient member to restrict communication from said inlet to said return via said central space in order to increase the fluid pressure in said one bore and said pressure chamber, and a push member disposed within said central space and extending through said inner wall to oppose said input member and said output member but normally spaced from said input member, said push member providing a rigid connection between said input member and said output member when said output member remains substantially stationary after a predetermined amount of movement of said input member.

2. The brake booster of claim 1 in which said inner wall defines a recess for receiving said resilient member, said return leading to said recess and said push member extending through a bore on said inner wall, said bore also leading to said recess and sealingly receiving said push member.

* * * * *